United States Patent
Oizumi

(10) Patent No.: US 12,439,216 B2
(45) Date of Patent: Oct. 7, 2025

(54) MICROPHONE STATE DISPLAY METHOD AND MICROPHONE STATE DISPLAY APPARATUS

(71) Applicant: Yamaha Corporation, Hamamatsu (JP)

(72) Inventor: Yoshifumi Oizumi, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 246 days.

(21) Appl. No.: 18/232,579

(22) Filed: Aug. 10, 2023

(65) Prior Publication Data

US 2024/0056753 A1    Feb. 15, 2024

(30) Foreign Application Priority Data

Aug. 15, 2022   (JP) ................................ 2022-129182

(51) Int. Cl.
*H04R 29/00* (2006.01)
*G06F 3/16* (2006.01)

(52) U.S. Cl.
CPC ........... *H04R 29/004* (2013.01); *G06F 3/165* (2013.01)

(58) Field of Classification Search
CPC .............................. H04R 29/004; G06F 3/165
See application file for complete search history.

(56) References Cited

U.S. PATENT DOCUMENTS

| | | | | |
|---|---|---|---|---|
| 9,154,613 B2* | 10/2015 | Deluca | .................... | H04M 1/19 |
| 2010/0310095 A1 | 12/2010 | Nakao | | |
| 2013/0321156 A1* | 12/2013 | Liu | ....................... | H04M 1/724 |
| | | | | 340/573.1 |
| 2015/0201278 A1* | 7/2015 | Bao | ......................... | H04R 3/005 |
| | | | | 381/92 |
| 2018/0174777 A1* | 6/2018 | Clementson | ............. | H04R 1/08 |
| 2018/0349086 A1* | 12/2018 | Chakra | ................. | H04W 64/00 |
| 2024/0028189 A1* | 1/2024 | Dong | ..................... | H04N 7/147 |

FOREIGN PATENT DOCUMENTS

| | | | | | |
|---|---|---|---|---|---|
| CN | 115086729 A | * | 9/2022 | ....... | H04N 21/42204 |
| CN | 115134620 A | * | 9/2022 | ......... | H04N 21/4788 |
| JP | 2005057402 A | * | 3/2005 | | |
| JP | 2010-283719 A | | 12/2010 | | |

* cited by examiner

*Primary Examiner* — David L Ton
(74) *Attorney, Agent, or Firm* — Crowell & Moring LLP

(57) ABSTRACT

A microphone state display method includes receiving a mute-on or a mute-off operation by each of a plurality of microphones, displaying a state of a microphone that has received the mute-off operation as a first state on a display, when receiving the mute-on operation, in a case in which at least one microphone among the plurality of microphones is in a mute-off state, displaying a state of a microphone that has received the mute-on operation as a second state on a display, and, when receiving the mute-on operation in a case in which all of the plurality of microphones are in a mute-on state, displaying the state of the microphone that has received the mute-on operation as a third state on a display.

18 Claims, 12 Drawing Sheets

MICROPHONE STATE DISPLAY METHOD AND MICROPHONE STATE DISPLAY APPARATUS

CROSS REFERENCE TO RELATED APPLICATIONS

This application claims priority under 35 U.S.C. § 119(a) to Japanese Patent Application No. 2022-129182, filed on Aug. 15, 2022, the entire contents of which is hereby incorporated by reference.

BACKGROUND

Technical Field

An embodiment of the present disclosure relates to a microphone state display method and a microphone state display apparatus that display a mute-on or mute-off state of a microphone.

Background Information

Japanese Unexamined Patent Application Publication No. 2010-283719 discloses a laptop PC connected to a plurality of microphones. The laptop PC includes a CPU. The laptop PC stores a control table in which a device ID corresponding to each of the plurality of microphones is registered. The CPU puts a microphone corresponding to the device ID registered in the control table into the same mute state by a single operation.

In a microphone system including a plurality of microphones, a certain talker (hereinafter, referred to as a talker A), when muting on the own microphone, may assume that the own voice has not reached a telephone call partner and may engage in a conversation desired not to be heard by the telephone call partner. At this time, a different microphone present in the same space as a space in which the talker A is present may be muted off. In such a case, the different microphone collects a conversation of the talker A. As a result, the different microphone may cause the conversation of the talker A to be heard by the telephone call partner.

SUMMARY

In view of the foregoing, an embodiment of the present disclosure present is directed to provide a microphone state display method capable of preventing a talker from mistakenly assuming that a telephone call partner cannot hear since a microphone is in a muted-on state.

A microphone state display method according to an embodiment of the present disclosure receives a mute-on or a mute-off operation by each of a plurality of microphones, displays a state of a microphone that has received the mute-off operation as a first state on a display, when receiving the mute-on operation, in a case in which at least one microphone among the plurality of microphones is in a mute-off state, displays a state of a microphone that has received the mute-on operation as a second state on the display, and, when receiving the mute-on operation, in a case in which all of the plurality of microphones are in a mute-on state, displays the state of the microphone that has received the mute-on operation as a third state on the display.

According to a microphone state display method according to an embodiment of the present disclosure, a talker can be prevented from mistakenly assuming that a telephone call partner cannot hear since a microphone is in a muted-on state.

DETAILED DESCRIPTION

First Embodiment

Figure 1:
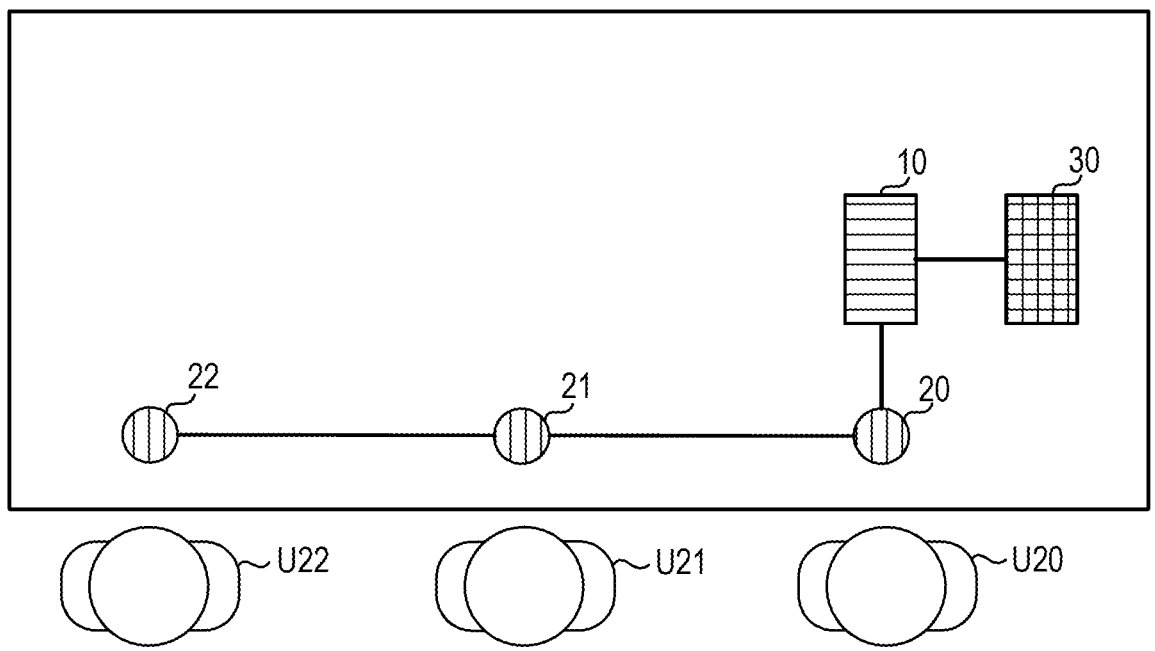
FIG. 1 is a block diagram showing an example of connection of a management apparatus 10, microphones 20, 21, and 22, and a PC 30.
Figure 2:
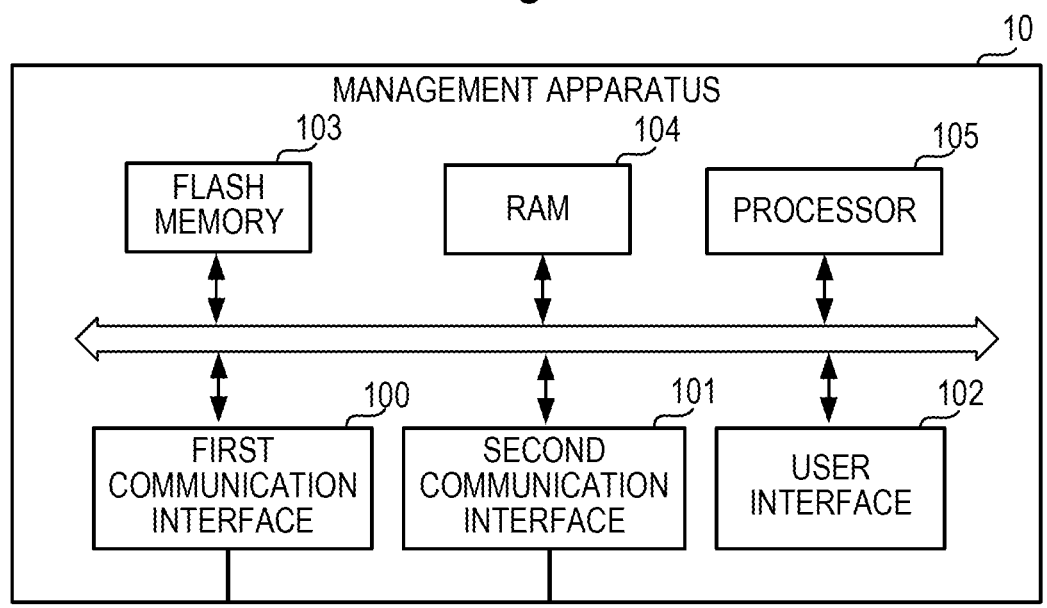
FIG. 2 is a block diagram showing a configuration of the management apparatus 10.

Hereinafter, a management apparatus 10 that executes a microphone state display method according to a first embodiment of the present disclosure will be described with reference to the drawings. FIG. 1 is a block diagram showing an example of connection of the management apparatus 10, microphones 20, 21, and 22, and a PC 30. FIG. 2 is a block diagram showing a configuration of the management apparatus 10.

The management apparatus 10 is used for a remote conversation, for example. As shown in FIG. 1, the management apparatus 10 connects the plurality of microphones 20, 21, and 22. Each of the plurality of microphones 20, 21, and 22 obtains an audio signal according to voice of talkers U20, U21, and U22, and sends the audio signal to the management apparatus 10. The management apparatus 10 performs various types of signal processing on an obtained audio signal, and sends the audio signal to the PC 30. The PC 30 sends a received audio signal to an information processing apparatus (not shown) such as a PC on a far-end side, through a communication line. In addition, the PC 30 receives the audio signal from the information processing apparatus such as a PC on a far-end side, through the communication line. The PC 30 sends the audio signal received from the information processing apparatus on the far-end side, to the management apparatus 10. The management apparatus 10 connects a speaker (not shown). The speaker outputs the voice of a talker on a far-end side, based on the audio signal received from the PC 30 through the management apparatus 10. As a result, the talkers U20, U21, and U22 can converse with the talker on a far-end side. The management apparatus 10 is an example of a microphone state display apparatus. The management apparatus 10 is an example of a first information processing apparatus to be connected to the plurality of microphones 20, 21, and 22.

It is to be noted that the PC 30 communicates with the information processing apparatus such as a PC on a far-end side, through a communication line such as the Internet or a LAN (Local Area Network). The PC 30 communicates with the information processing apparatus such as a PC on a far-end side, through a wireless or wired connection.

It is to be noted that, in the example shown in FIG. 1, although the three microphones 20, 21, and 22 are connected to the management apparatus 10, the number of microphones to be connected to the management apparatus 10 may not necessarily be three. The management apparatus 10 may be connected to two microphones or may be connected to four or more microphones.

It is to be noted that the management apparatus 10 does not necessarily have to be connected to the speaker. For example, the PC 30 may connect a speaker (not shown). In such a case, the speaker connected to the PC 30 makes an output, based on the audio signal received from the information processing apparatus such as a PC on a far-end side.

The management apparatus 10, as shown in FIG. 2, includes a first communication interface 100, a second communication interface 101, a user interface 102, a flash memory 103, a RAM (Random Access Memory) 104, and a processor 105. The processor 105 is, for example, a CPU (Central Processing Unit).

The first communication interface 100 communicates with the microphones 20, 21, and 22 through a signal line such as a LAN cable. The first communication interface 100 receives the audio signal according to the voice of the talkers U20, U21, and U22, from each of the microphones 20, 21, and 22.

The second communication interface 101 is an interface based on standards such as a USB (Universal Serial Bus). The second communication interface 101 communicates with the PC 30 through a signal line. The processor 105 mixes audio signals obtained from the microphones 20, 21, and 22, and sends mixed audio signals to the PC 30.

It is to be noted that the management apparatus 10 does not necessarily have to communicate with the microphones 20, 21, and 22 through the wired connection. The management apparatus 10 may communicate with the microphones 20, 21, and 22 through the wireless connection based on standards such as Bluetooth (registered trademark).

The user interface 102 receives an operation to the management apparatus 10 from a user of the management apparatus 10. The user interface 102 is a button or the like for volume control of the management apparatus 10.

The flash memory 103 stores various programs. The various programs are, for example, a program to operate the management apparatus 10, a program to execute processing according to the microphone state display method, or the like. In addition, the flash memory 103 stores data (hereinafter, referred to as state data) showing whether each of the microphones 20, 21, and 22 connected to the management apparatus 10 is in a mute-off state or a mute-on state. For example, the flash memory 103 stores the state data showing "microphone 20: mute off, microphone 21: mute on, and microphone 22: mute off."

It is to be noted that the flash memory 103 does not necessarily have to store the various programs. The various programs may be stored in a different apparatus such as a server, for example. In such a case, the management apparatus 10 receives various programs from the different apparatus such as a server.

The processor 105 executes various types of operations by reading out the program stored in the flash memory 103, to the RAM 104. The processor 105, for example, performs processing according to communication between the management apparatus 10 and the microphones 20, 21, and 22, or processing according to communication between the management apparatus 10 and the PC 30.

Figure 3:
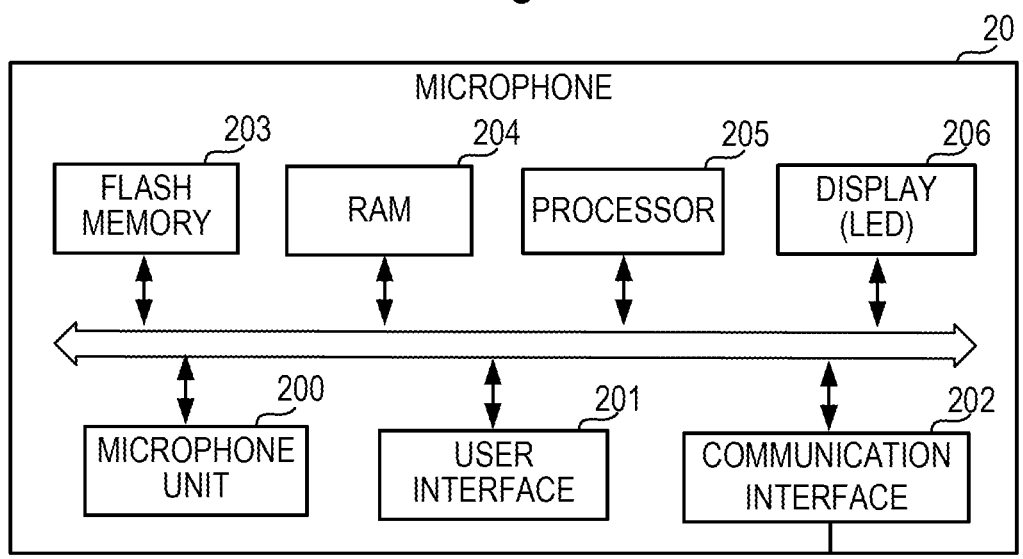
FIG. 3 is a block diagram showing a configuration of the microphone 20.

Hereinafter, a configuration of the microphones 20, 21, and 22 will be described with reference to the drawings. FIG. 3 is a block diagram showing the configuration of the microphone 20. The configuration of the microphones 21 and 22 is the same as the configuration of the microphone 20. Hereinafter, the configuration of the microphone 20 will be described as an example and a description of the configuration of the microphones 21 and 22 will be omitted.

The microphone 20, as shown in FIG. 3, includes a microphone unit 200, a user interface 201, a communication interface 202, a flash memory 203, a RAM 204, a processor 205, and a display 206. The processor 205 is, for example, a CPU. The display 206 is, for example, an LED (Light Emitting Diode).

The microphone unit 200 converts a sound into an audio signal being an electric signal. In the example shown in FIG. 1, the microphone unit 200 obtains the voice of the talker U20, and converts obtained voice of the talker U20 into an audio signal. The microphone unit 200 outputs the audio signal obtained by conversion, to the communication interface 202.

The user interface 201 receives a mute-on or mute-off operation of the microphone 20, from the talker U20. The user interface 201 is, for example, a switching button. The talker U20 switches mute-on or mute-off of the microphone 20 by operating the switching button.

The communication interface 202 communicates with the management apparatus 10 through a signal line such as a LAN cable. The communication interface 202 sends the audio signal obtained by the microphone unit 200, to the management apparatus 10. The communication interface 202, in a case in which the user interface 201 receives the mute-on operation, does not send the audio signal to the management apparatus 10. The communication interface 202, in a case in which the user interface 201 receives the mute-off operation, sends the audio signal to the management apparatus 10.

It is to be noted that the management apparatus 10 does not output the audio signal received from the microphones 20, 21, and 22 that have received the mute-on operation, to the PC 30, which may achieve a mute-on function.

The flash memory 203 stores various programs. The various programs may include a program to operate the microphone 20. The program to operate the microphone 20 is a program according to communication between the management apparatus 10 and the microphone 20, a program according to the display of the display 206, or the like.

The processor 205 executes various types of operations by reading out the program stored in the flash memory 203, to the RAM 204.

In the present embodiment, the display 206 is configured by three LEDs of a green LED, an orange LED, and a red LED, for example. The display 206 turns on the green LED, the orange LED, or the red LED, based on control of the processor 205. Specifically, the processor 205 receives a command to turn on or turn off either of the green LED, the orange LED, or the red LED, from the processor 105. The processor 205 controls turn-on or turn-off of the green LED, the orange LED, or the red LED, based on the command received from the processor 105.

Figure 4:
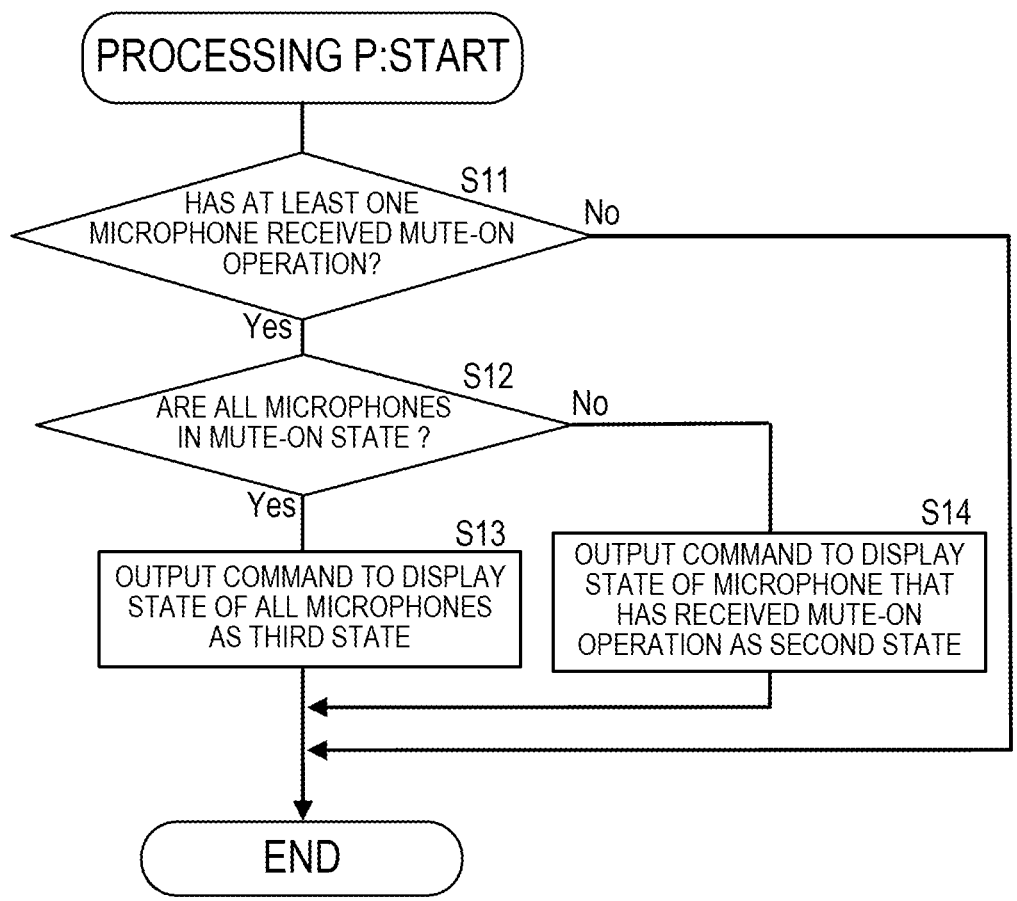
FIG. 4 is a flow chart showing an example of processing of a processor 105 when at least one microphone receives a mute-on operation.
Figure 5:
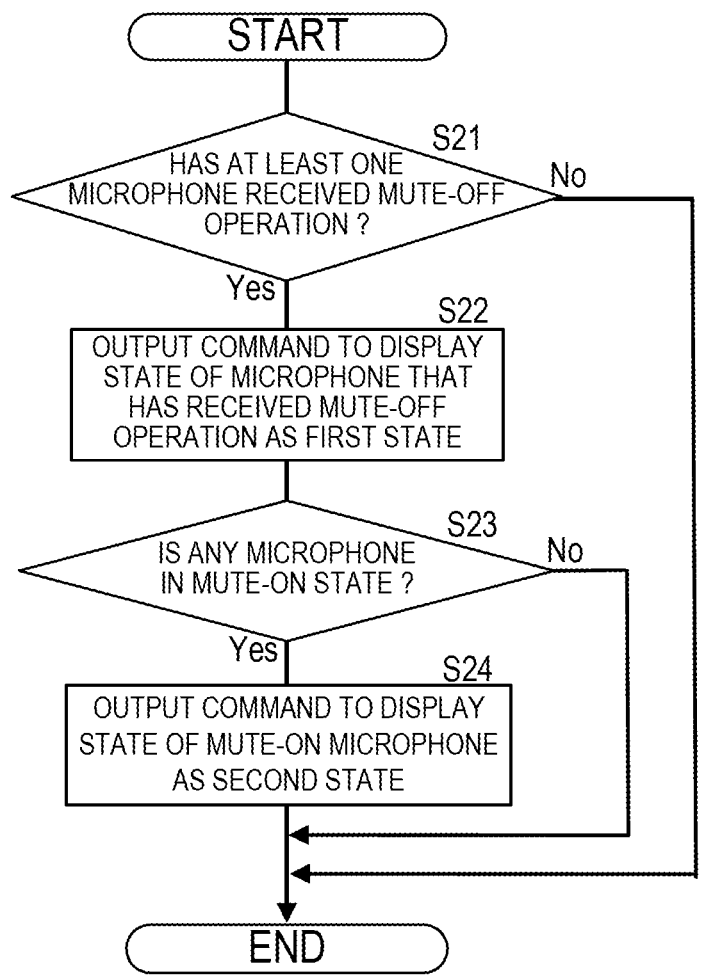
FIG. 5 is a flow chart showing an example of processing of the processor 105 when at least one microphone receives a mute-off operation.

The processor 105 executes processing (hereinafter, referred to as processing P) to change the display of the display 206 of the microphones 20, 21, and 22, when receiving the mute-on or mute-off operation from the microphones 20, 21, and 22. Hereinafter, the processing P will be described with reference to the drawings. FIG. 4 is a flow chart showing an example of the processing of the processor 105 when at least one microphone receives the mute-on operation. FIG. 5 is a flow chart showing an example of the processing of the processor 105 when at least one microphone receives the mute-off operation.

The processor 105, for example, starts the processing P when the management apparatus 10 is powered on (FIG. 4 or FIG. 5: START).

After the start of the processing P (FIG. 4: START), the processor 105 determines whether or not at least one microphone of the microphones 20, 21, and 22 has received the mute-on operation (FIG. 4: Step S11). For example, the user interface 201 of the microphone 20 receives an operation to switch to the mute-on, from the talker U20. At this time, the processor 205 of the microphone 20 sends a signal that shows that the microphone 20 has received the mute-on operation, to the processor 105. The processor 105, when having received the signal, determines to have received the mute-on operation by the microphone 20. At this time, the processor 105 updates information according to the microphone 20 in the state data to "microphone 20: mute on," for example.

In a case in which, in Step S11, the processor 105, when determining to have received the mute-on operation by at least one microphone among the microphones 20, 21, and 22 (FIG. 4: Yes in Step S11), determines whether or not all the microphones 20, 21, and 22 are in the mute-on state (FIG. 4: Step S12). The processor 105, by referring to the state data stored in the flash memory 103, determines whether all the microphones 20, 21, and 22 are in the mute-on state or the mute-off state.

In a case in which the processor 105 determines that all the microphones 20, 21, and 22 are in the mute-on state (FIG. 4: Yes in Step S12), outputs a command to cause the display 206 to display the states of all the microphones 20, 21, and 22 as a third state (FIG. 4: Step S13).

For example, in FIG. 1, when the microphone 20 is muted off, and when the microphones 21 and 22 are muted on, the microphone 20 receives the mute-on operation. In such a case, all the microphones 20, 21, and 22 are in the mute-on state. The processor 105 outputs the command to display the state of the microphone 20 as the third state, to the microphone 20. In the present embodiment, the processor 105 outputs a command to cause the red LED of the microphone 20 to be turned on as the third state. The processor 205 of the microphone 20 turns on the red LED, based on the command. Similarly, the processor 105 outputs a command to display the state of the microphones 21 and 22 as the third state, to each of the microphones 21 and 22. The processor 205 of the microphones 21 and 22 turn on the red LED, based on the command.

In Step S12, in a case in which the processor 105 determines that at least one microphone is in the mute-off state (FIG. 4: No in Step S12), outputs a command to cause the display 206 to display the state of the microphone that has received the mute-on operation as a second state (FIG. 4: Step S14).

For example, in FIG. 1, when the microphones 20 and 21 are muted off, and when the microphone 22 is muted on, the microphone 20 receives the mute-on operation. In such a case, the microphone 21 is in the mute-off state. Therefore, the processor 105 outputs the command to display the state of the microphone 20 as the second state, to the microphone 20. In the present embodiment, the processor 105 outputs a command to cause the orange LED of the microphone 20 to be turned on as the second state. The processor 205 of the microphone 20 turns on the orange LED, based on the command.

The processor 105, when executing processing that determines that at least one microphone does not receive the mute-on operation (FIG. 4: No in Step S11), processing of Step S13, or processing of Step S14, ends the processing P (FIG. 4: END).

In addition, after the start of the processing P (FIG. 5: START), the processor 105 determines whether or not at least one microphone has received the mute-off operation (FIG. 5: Step S21). For example, the processor 105, in a case in which the user interface 201 of the microphone 20 has received the mute-off operation, determines that the microphone 20 has received the mute-off operation.

The processor 105, in a case of determining that at least one microphone receives the mute-off operation (FIG. 5: Yes in Step S21), outputs a command to cause the display 206 to display the state of the microphone that has received the mute-off operation as a first state (FIG. 5: Step S22).

For example, the microphone 20 receives the mute-off operation. The processor 105 outputs the command to display the state of the microphone 20 as the first state, to the microphone 20. In the present embodiment, the processor 105 outputs a command to cause the green LED of the microphone 20 to be turned on as the first state. The processor 205 of the microphone 20 turns on the green LED, based on the command.

After Step S22, the processor 105, by referring to the state data stored in the flash memory 103, determines whether or not any of the microphones 20, 21, and 22 is in the mute-on state (FIG. 5: Step S23).

In Step S23, the processor 105, in a case of determining that any of the microphones 20, 21, and 22 is in the mute-on state (FIG. 5: Yes in Step S23), outputs a command to cause the state of the mute-on microphone to be displayed as the second state, to the mute-on microphone (FIG. 5: Step S24).

For example, in FIG. 1, when all the microphones 20, 21, and 22 are in the mute-on state, the microphone 20 receives the mute-off operation. In such a case, the microphones 21 and 22 are in the mute-on state. Therefore, the processor 105 outputs a command to cause the display 206 of the microphones 21 and 22 to display the state of the microphones 21 and 22 as the second state, to the microphones 21 and 22. The processor 205 of the microphones 21 and 22 turns on the orange LED, based on the command.

The processor 105, when executing processing that determines that at least one microphone does not receive the mute-off operation (FIG. 5: No in Step S21), processing that determines that no microphone in the mute-on state is present (FIG. 5: No in Step S23), or processing of Step S24, ends the processing P (FIG. 5: END).

It is to be noted that the processor 105 does not necessarily have to start the processing P when the management apparatus 10 is powered on. The processor 105, for example, in a case of receiving an operation to start execution of an application program according to the processing P, may start the processing P. In such a case, the management apparatus 10 includes a button that receives the start of the processing P as the user interface 201, for example.

Figure 6:
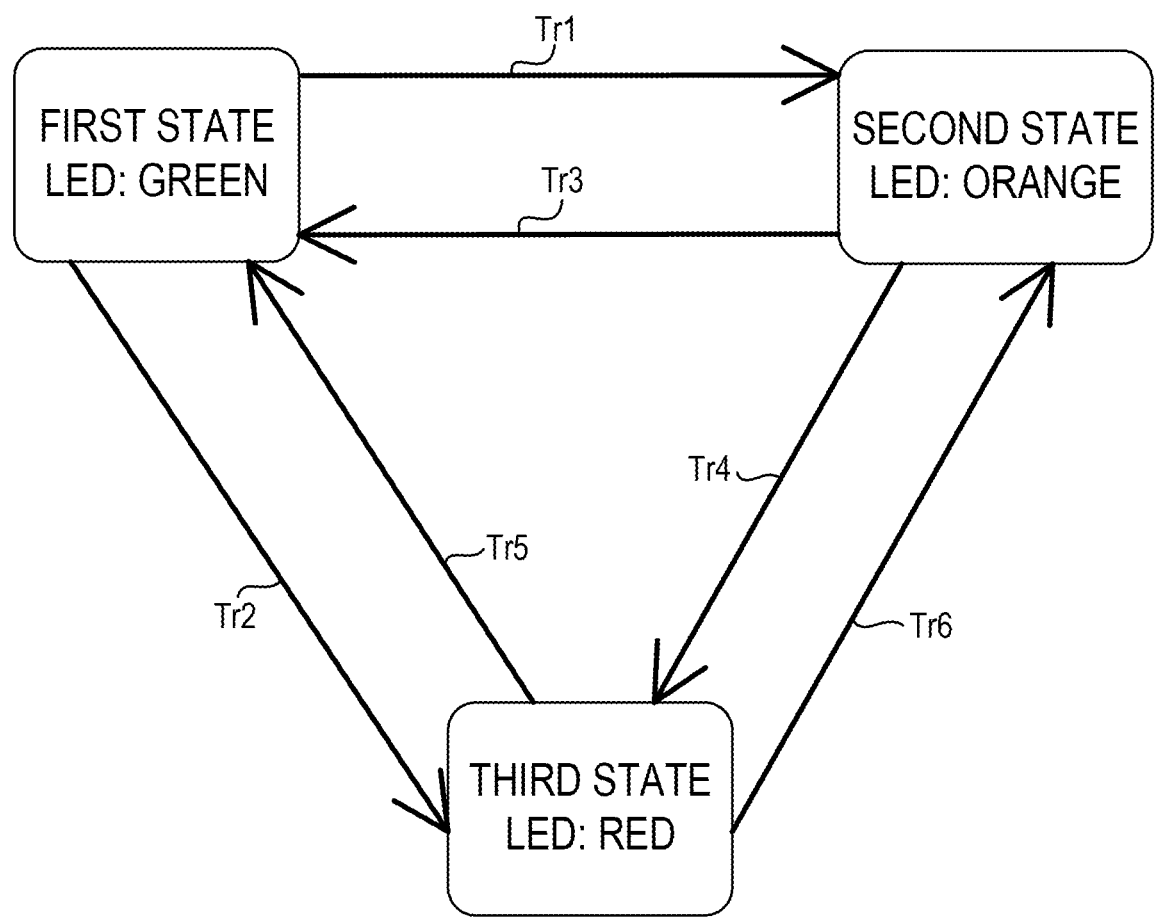
FIG. 6 is a view showing state transition of the microphone 20.

With the above processing P, each of the microphones 20, 21, and 22 transitions into the first state, the second state, and the third state. Hereinafter, transition of a state of the microphones 20, 21, and 22 will be described with reference to the drawings. FIG. 6 is a view showing state transition of the microphone 20. The state transition of the microphones 21 and 22 is the same as the state transition of the microphone 20. Hereinafter, the state transition of the microphone 20 will be described as an example and a description of the state transition of the microphones 21 and 22 will be omitted.

As shown in FIG. 6, the microphone 20 (a first microphone) displayed as the first state transitions to the second state or the third state.

When the microphone 20 displayed as the first state receives the mute-on operation, in a case in which at least one microphone among the microphones 21 and 22 is in the mute-off state (in a case of satisfying a condition Tr1 shown in FIG. 6), the display of the microphone 20 transitions from the first state to the second state.

When the microphone 20 displayed as the first state receives the mute-on operation, in a case in which all the microphones 20, 21, and 22 are in the mute-on state (in a case of satisfying a condition Tr2 shown in FIG. 6), the display of the microphone 20 transitions from the first state to the third state.

As shown in FIG. 6, the microphone 20 (a second microphone) displayed as the second state transitions to the second state or the third state.

When the microphone 20 displayed as the second state receives the mute-off operation (in a case of satisfying a condition Tr3 shown in FIG. 6), the display of the microphone 20 transitions from the second state to the first state.

In a case in which all the microphones 20, 21, and 22 are in the mute-on state (in a case of satisfying a condition Tr4 shown in FIG. 6), the display of the microphone 20 displayed as the second state transitions from the second state to the third state.

As shown in FIG. 6, the microphone 20 (a third microphone) displayed as the third state transitions to the first state or the second state. Specifically, the microphone 20 displayed as the third state, in a case of satisfying a condition Tr5, transitions to the first state while, in a case of satisfying a condition Tr6, transitioning to the second state.

The condition Tr5 is, for example, a condition that "the microphone 20 in the mute-on state receives the mute-off operation." Therefore, when the microphone 20 displayed as the third state receives the mute-off operation (in the case of satisfying the condition Tr5 shown in FIG. 6), the display of the microphone 20 transitions from the third state to the first state.

The condition Tr6 is, for example, a condition that "the microphone 20 is in the mute-on state while the microphone 21 or the microphone 22 being a microphone other than the microphone 20 is in the mute-off state." Therefore, in a case in which at least one microphone (the microphone 21 or the microphone 22) other than microphone 20, among the microphones 20, 21, and 22, is in the mute-off state (in the case of satisfying the condition Tr6 shown in FIG. 6), the display of the microphone 20 transitions from the third state to the second state.

It is to be noted that the display 206 does not necessarily have to be configured by the LEDs of green, orange, and red, and may be configured by the LED of a color other than green, orange, and red.

It is to be noted that the display 206 may be configured by one LED of which the color changes. For example, the one LED changes to any of the colors of green, orange, and red. The processor 105 outputs a command to change the color of the one LED, to the processor 205.

It is to be noted that, in the present embodiment, the processor 205, instead of displaying the LED in different colors, may display the one LED at a different blinking rate corresponding to each of the first state, the second state, and the third state. For example, the processor 105, in a case in which the microphone 20 is in the first state, always turns on the LED. For example, the processor 205, in a case in which the microphone 20 is in the second state, blinks the LED at an interval of once per second. For example, the processor 205, in a case in which the microphone 20 is in the third state, turns on the LED (at an interval of once every 0.5 seconds, for example) at a faster rate than the second state. As a result, the talker U20 can recognize the state of the microphone 20 without depending on the color.

It is to be noted that the display 206 may not necessarily be the LED. The displays 206 may be a screen such as an organic electroluminescence display, for example. In such a case, the display 206 displays a text message (a text message saying that "the microphone 20 is in the first state," for example) or the like that shows the state of the microphone 20. As a result, the talker U20 can recognize the state of the microphone 20 without depending on the color.

Effect of First Embodiment

According to the management apparatus 10, for example, the talker U20 can be prevented from mistakenly assuming that a telephone call partner cannot hear because the microphone 20 is in the mute-on state. For example, the talker U20 mutes on the microphone 20. At this time, the management apparatus 10, in a case in which at least one microphone of the microphones 21 and 22 is muted off, displays on the display 206 of the microphone 20 the state of the microphone 20 as the second state. The talker U20, by looking at the display 206 of the microphone 20, can know that the own voice can be heard by a telephone call partner because either of the microphones 21 and 22 is in the mute-off state. In short, the talker U20 does not mistakenly assume that the own voice cannot be heard by the telephone call partner. As a result, the talker U20 does not carelessly conduct a conversation desired not to be heard by the telephone call partner and can enjoy customer experience to smoothly talk on the telephone.

(Modification 1)

Figure 7:
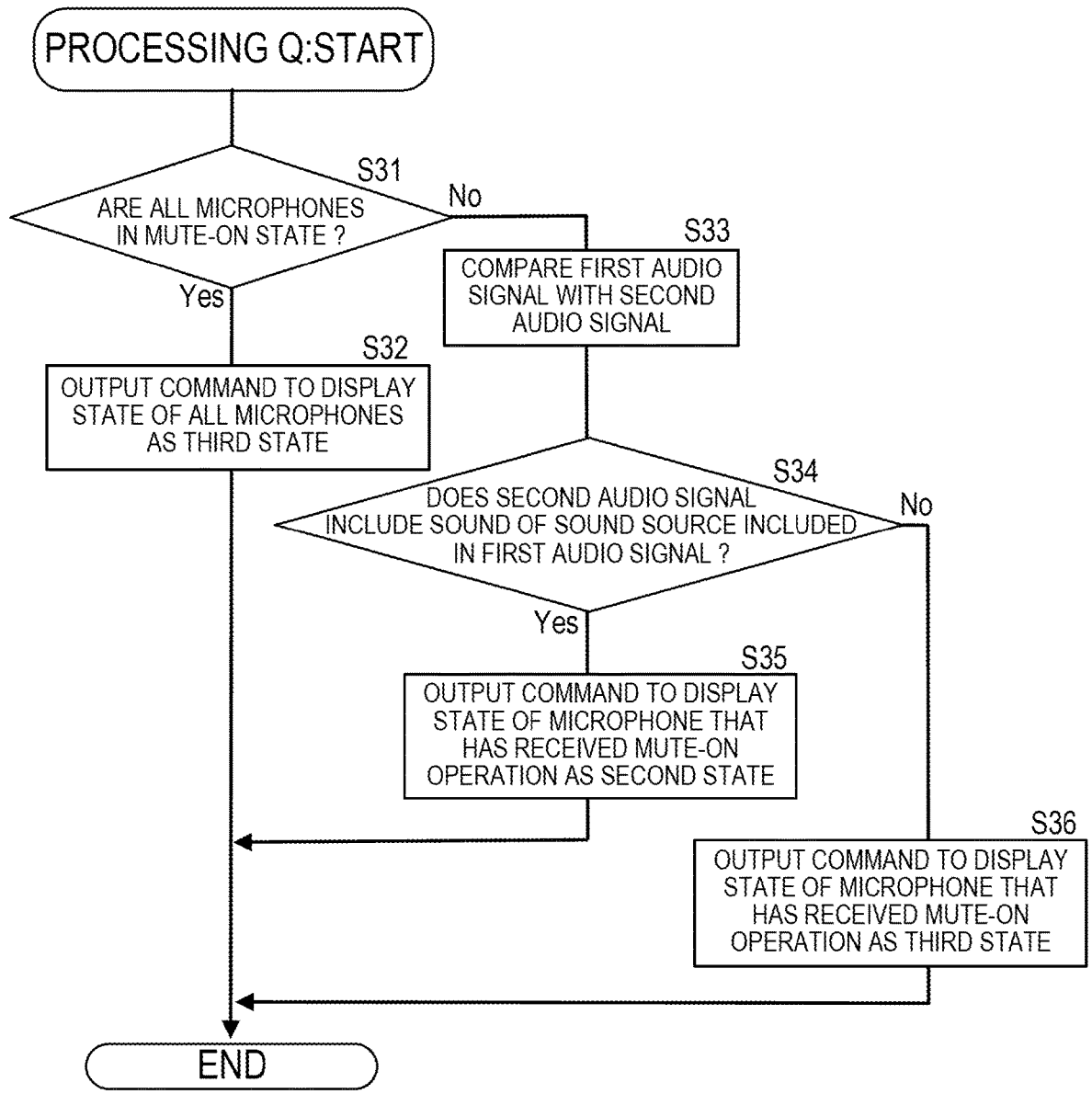
FIG. 7 is a flow chart showing an example of processing of a processor 105a included in a management apparatus 10a according to Modification 1.

Hereinafter, a management apparatus 10a according to Modification 1 and a processor 105a (not shown) included in the management apparatus 10a will be described with reference to the drawings. FIG. 7 is a flow chart showing an example of processing of the processor 105a included in the management apparatus 10a according to Modification 1. It is to be noted that, since the configurations other than the processor 105a in the management apparatus 10a are the same or substantially the same as the configurations of the management apparatus 10, the illustration of the management apparatus 10a is omitted.

The management apparatus 10a is different from the management apparatus 10 in that processing (hereinafter, referred to as processing Q) to determine whether or not a sound obtained by a certain microphone, when obtained, is diffracted to other microphones is executed. The management apparatus 10a, when being powered on or when receiving an operation to start an application program according to the processing Q, for example, starts the execution of the processing Q (FIG. 7: START).

After the start of the processing Q, the processor 105a determines whether or not all the microphones are in the mute-on state (FIG. 7: Step S31).

The processor 105a, in a case of determining that at least one microphone is in the mute-off state (FIG. 7: No in Step S31), performs comparison between an audio signal (hereinafter, referred to as a first audio signal) obtained by the microphone in the mute-on state and an audio signal (hereinafter, referred to as a second audio signal) obtained by the microphone in the mute-off state (FIG. 7: Step S33). The processor 105a determines whether or not the second audio signal includes a sound of a sound source included in the first audio signal, based on a result of the comparison (FIG. 7: Step S34).

For example, the microphone 20 obtains voice of the talker U20. At this time, the voice of the talker U20 may be diffracted to the microphone 21 present in the same space and may be obtained by the microphone 21. In such a case, the second audio signal obtained by the microphone 21 includes the voice of the talker U20 included in the first audio signal obtained by the microphone 20. At this time, the processor 105a determines that "the second audio signal includes the sound of the sound source included in the first audio signal." The processor 105a determines whether or not diffraction of the sound occurs in each of all the microphones in the mute-off state.

In the present modification, the processor 105a performs the comparison, based on a cross correlation between the first audio signal and the second audio signal. Specifically, the processor 105a calculates a peak value of the cross correlation between the first audio signal and the second audio signal. The processor 105a, when the peak value is high (in a case in which the peak value is not less than a predetermined threshold value), determines that the second audio signal includes the sound of the sound source included in the first audio signal.

In a case in which the processor 105a determines that "the second audio signal includes the sound of the sound source included in the first audio signal" (FIG. 7: Yes in Step S34), outputs a command to cause the display 206 to display the state of the microphone that has received the mute-on operation as the second state (FIG. 7: Step S35). For example, in a case in which the second audio signal obtained by the microphone 21 or the microphone 22 includes the voice of the talker U20 included in the first audio signal obtained by the microphone 20, the voice of the talker U20 is able to be heard by a telephone call partner through the microphone 21 or the microphone 22. Then, the processor 105a causes the display 206 of the microphone 20 to display the state of the microphone 20 as the second state. The talker U20, by looking at the display of the microphone 20, can know in advance (before conducting a conversation desired not to be heard by a telephone call partner) that the own voice is diffracted to the microphone 21 or the microphone 22 and is obtained. As a result, the talker U20 does not carelessly conduct the conversation desired not to be heard by the telephone call partner and can enjoy customer experience to smoothly talk on the telephone.

In a case in which the processor 105a determines that "the second audio signal does not include the sound of the sound source included in the first audio signal" (FIG. 7: No in Step S34), outputs a command to cause the display 206 to display the state of the microphone that has received the mute-on operation as the third state, even when at least one microphone among the plurality of microphones 20, 21, and 22 is in the mute-off state (FIG. 7: Step S36).

For example, in a case in which the second audio signal obtained by the microphone 21 and the microphone 22 does not include the voice of the talker U20 included in the first audio signal obtained by the microphone 20, the voice of the talker U20 is obtained without being diffracted to the microphone 21 and the microphone 22. Accordingly, the voice of the talker U20 is not heard by a telephone call partner through the microphones 21 and 22. Then, the processor 105a causes the display 206 of the microphone 20 to display the state of the microphone 20 as the third state. The talker U20, by looking at the display of the microphone 20, can easily determine whether the own conversation is heard by a telephone call partner or not, and thus can enjoy customer experience to smoothly talk on the telephone.

In Step S31, in a case in which the processor 105a determines that all the microphones are in the mute-on state (FIG. 7: Yes in Step S31), outputs a command to cause the display 206 to display the state of all the microphones as the third state (FIG. 7: Step S32).

The processor 105a, when executing processing of Step S32, processing of Step S35, or processing of Step S36, ends the processing P (FIG. 7: END).

It is to be noted that the processor 105a may repeatedly execute the processing Q. In such a case, the processor 105a, when the management apparatus 10a is powered off or when an operation to end an application program according to the processing Q is received, for example, ends the processing Q.

It is to be noted that the processor 105a may execute both the processing P and processing Q in parallel.

(Modification 2)

Figure 8:
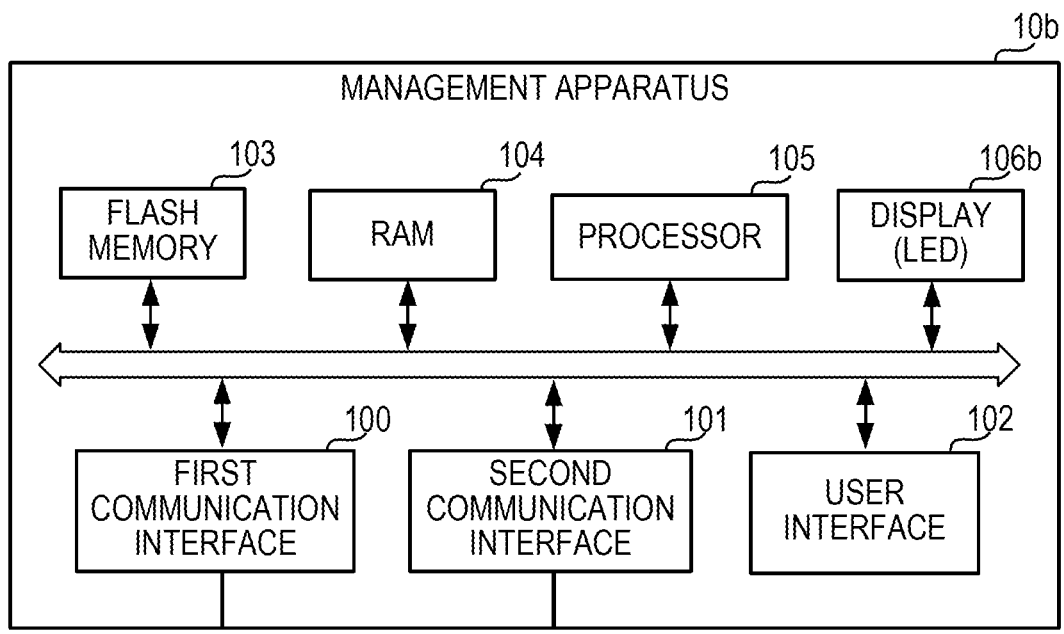
FIG. 8 is a block diagram showing a configuration of a management apparatus 10b according to Modification 2.

Hereinafter, a management apparatus 10b according to Modification 2 will be described with reference to the drawings. FIG. 8 is a block diagram showing a configuration of the management apparatus 10b according to Modification 2. It is to be noted that, in the management apparatus 10b, the same reference numerals are assigned to the same configurations in the management apparatus 10, and the description is omitted.

As shown in FIG. 8, the management apparatus 10b is different from the management apparatus 10 in that a display 106b is provided. The display 106b, for example, is a LED as with the display 206 of the microphone 20. The processor 105 of the management apparatus 10b, when receiving the mute-on or mute-off operation in the microphones 20, 21, and 22, executes processing to change the display of the display 106b.

In a case in which the management apparatus 10b includes the display 106b as described in the present modification, each of the microphones 20 to 22 connected to the management apparatus 10b does not necessarily have to include the display 206.

Such a management apparatus 10b is able to produce an advantageous effect similar to the advantageous effect achieved by the management apparatus 10.

(Modification 3)

Figure 9:
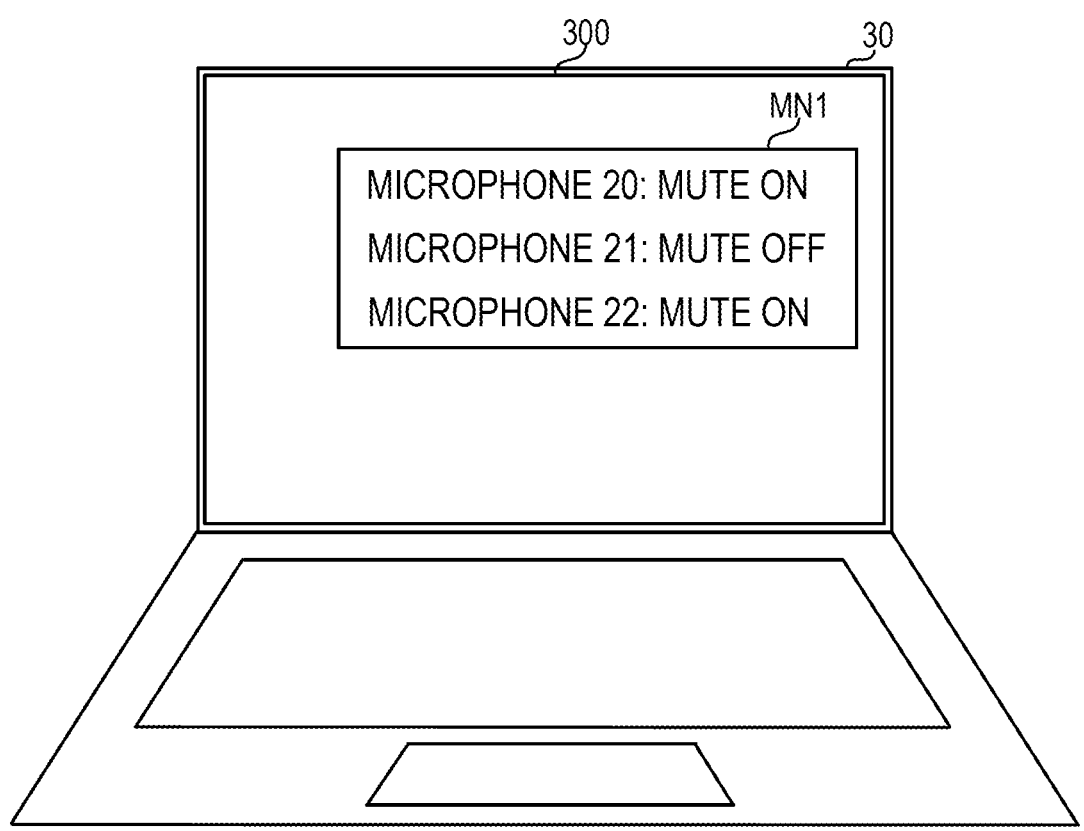
FIG. 9 is a view showing an example of processing of a management apparatus 10c according to Modification 3.
Figure 10:
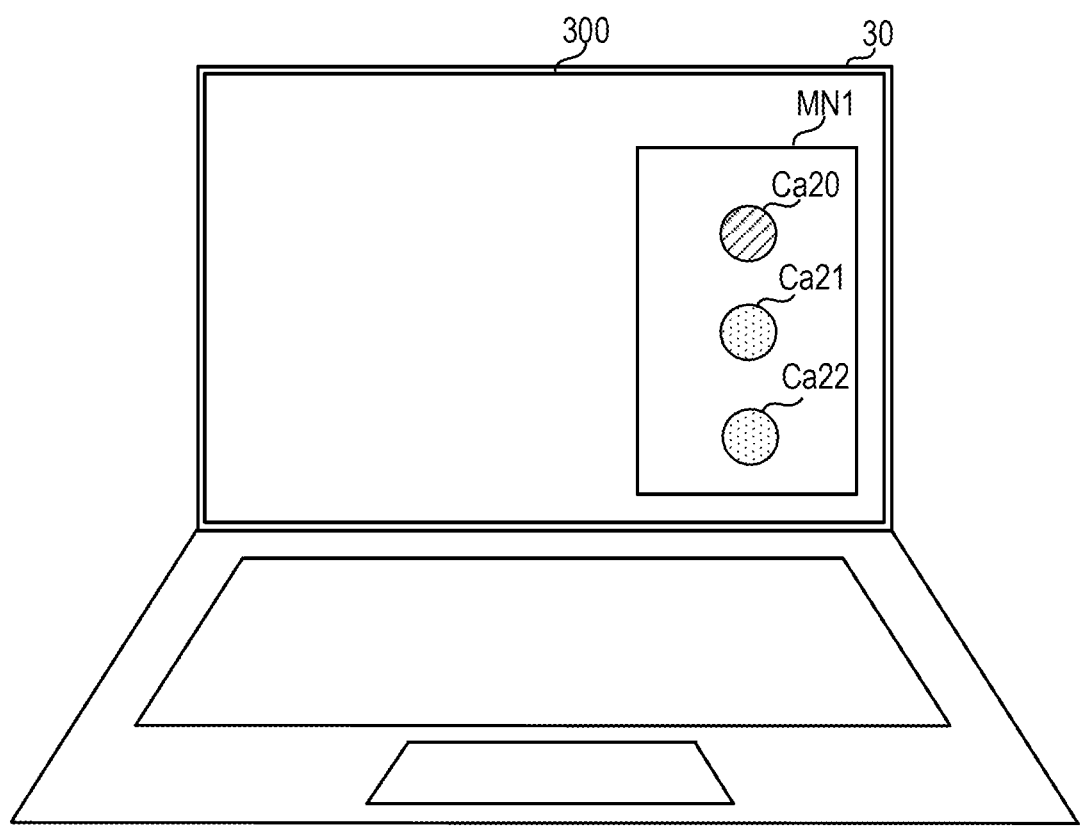
FIG. 10 is a view showing an example of a menu screen MN1 displayed on an LCD 300.

Hereinafter, a management apparatus 10c according to Modification 3 will be described with reference to the drawings. FIG. 9 is a view showing an example of processing of the management apparatus 10c according to Modification 3. FIG. 10 is a view showing an example of a menu screen MN1 displayed on an LCD 300. It is to be noted that, since the configurations of the management apparatus 10c are the same or substantially the same as the configurations of the management apparatus 10, the illustration of the management apparatus 10c is omitted.

The management apparatus 10c is different from the management apparatus 10 in that the state of the microphones 20 to 22 is displayed on a display such as an LCD (Liquid Crystal Display) or an organic electroluminescence display included in the PC 30 (a second information processing apparatus). For example, the management apparatus 10c, as shown in FIG. 9, outputs a command to cause the LCD 300 (the display) included in the PC 30 to display the state of the microphones 20 to 22, to the PC 30. The PC 30 displays the state of the microphones 20 to 22 on OSD (On Screen Display), based on the command, for example. The OSD functions to display on a display a menu screen according to setting of a device or the like. For example, the PC 30, as shown in FIG. 9, displays on the LCD 300 the menu screen MN1 that displays the state of the microphones 20 to 22 by the OSD. The PC 30 displays text messages saying that "microphone 20: mute ON, microphone 21: mute OFF, microphone 22: mute ON" on the menu screen MN1, for example. In the present modification, the PC 30 is an example of the information processing apparatus connected to the management apparatus 10c (the microphone state display apparatus).

It is to be noted that the PC 30 does not necessarily have to show the state of the microphones 20, 21, and 22 by displaying a text message on the menu screen MN1. For example, the PC 30, by displaying images Ca20, Ca21, and Ca22 that respectively simulate the microphones 20, 21, and 22 on the menu screen MN1 and changing the color of the images Ca20, Ca21, and Ca22, may show the state of the microphones 20, 21, and 22 (see FIG. 10). For example, the PC 30 changes the color of the image Ca20 to green when the microphone 20 is in the mute-off state. The talkers U20, U21, and U22, by recognizing that the color of the image Ca20 is green, can know that the microphone 20 is in the mute-off state. As a result, the talkers U20, U21, and U22 can enjoy the same customer experience as the customer experience of the management apparatus 10.

(Effect of Modification 3)

The management apparatus 10c displays on the menu screen MN1 the state of all the microphones (the microphones 20, 21, and 22) connected to the management apparatus 10c. The talker U20, by looking at the menu screen MN1, can know not only the state of the microphone 20 using currently but also the state of each of the microphones 21 and 22. Therefore, the talker U20 can determine whether or not a microphone being muted off is present in the own vicinity. Accordingly, the talker U20 does not carelessly conduct the conversation desired not to be heard by the telephone call partner and can enjoy customer experience to smoothly talk on the telephone. In a similar manner, the talkers U21 and U22 can determine whether or not a microphone being muted off is present in each vicinity of the talkers U21 and U22.

It is to be noted that, in the present modification, the PC 30 does not necessarily have to display the state of the microphones 20 to 22. The management apparatus 10c is connected to a smartphone (an example of the information processing apparatus connected to the microphone state display apparatus) that has the same function as the PC 30, for example, and the display included in the smartphone may display the state of the microphones 20 to 22.

(Modification 4)

Hereinafter, a management apparatus 10d according to Modification 4 will be described with reference to the drawings. It is to be noted that, since the configurations other than the processor 105d in the management apparatus 10d are the same or substantially the same as the configurations of the management apparatus 10, the illustration of the management apparatus 10d is omitted.

The management apparatus 10d is different from the management apparatus 10 in that the display of the display 206 is changed based on an image obtained by a camera (hereinafter, referred to as a capturing camera). In the present modification, the capturing camera is connected to the management apparatus 10d.

The capturing camera obtains an image, for example, by capturing a space in which the capturing camera is placed. For example, the capturing camera is placed in a space (inside of a conference room, or the like) in which the talker U20 makes a remote telephone call. The microphone 20 that the talker U20 uses to make a telephone call is placed in the space.

The processor 105d (not shown) included in the management apparatus 10d receives an image from the capturing camera. The processor 105d, by performing analysis processing of a received image, determines whether or not a microphone other than the microphone 20 is captured in the image. In other words, the processor 105d determines whether or not a microphone other than the microphone 20 that the talker U20 uses is present in the space in which the talker U20 is present. It is to be noted that the analysis processing is, for example, analysis processing by artificial intelligence such as a neural network (DNN (Deep Neural Network), for example) or analysis processing by pattern matching using template data.

Even when the microphones 21 and 22 are muted off, in a case in which the microphones 21 and 22 (the microphones other than the microphone 20 that the talker U20 uses) are not present in the space in which the talker U20 is present, the voice of the talker U20 is not collected by the microphones 21 and 22. Accordingly, the conversation that the talker U20 desires not to be heard by a telephone call partner may not be heard by the telephone call partner through the microphone other than the microphone 20. Accordingly, in the present modification, the processor 105d, in a case of determining that no microphone other than the microphone 20 is present in the space in which the talker U20 is present, causes the display 206 to display the state of the microphone 20 as the third state. The talker U20, by looking at the display of the microphone 20, can know that the own conversation is not heard by a telephone call partner, and thus can enjoy customer experience to smoothly talk on the telephone.

On the other hand, the processor 105d, in a case of determining that a microphone other than the microphone 20 is present in the space in which the talker U20 is present, performs the same processing (the processing of Steps S11 to S14 or the processing of Steps S21 to S24) as the processor 105.

It is to be noted that, in place of the management apparatus 10d, the capturing camera may be connected to the PC 30. In such a case, the management apparatus 10d causes the display 206 to display the state of the microphones 20, 21, and 22, based on the image obtained by the camera connected to the PC 30.

Application Example 1 of Management Apparatus 10d

Hereinafter, Application Example 1 of a management apparatus 10d will be described. In the present application example, the management apparatus 10d performs processing (superimposition) to superimpose an image that shows the state of the microphones 20, 21, and 22 on an image obtained by the capturing camera. For example, the capturing camera captures the face of the talker U20 and obtains an image in which the face of the talker U20 is captured. The management apparatus 10d, by superimposing the image that shows the state of the microphone 20 on the image in which the face of the talker U20 is captured, generates an image (hereinafter, referred to as a first image) that associates the talker U20 with the state of the microphone 20. Each PC that the talkers U20, U21, and U22 use receives the first image from the management apparatus 10d and displays the first image. The talkers U20, U21, and U22, by looking at the first image displayed on each PC, can know the state of the microphone 20 that the talker U20 uses. As a result, the talkers U20, U21, and U22, when the microphone 20 is muted off, does not carelessly conduct the conversation desired not to be heard by the telephone call partner and can enjoy customer experience to smoothly talk on the telephone.

Application Example 2 of Management Apparatus 10d

Figure 11:
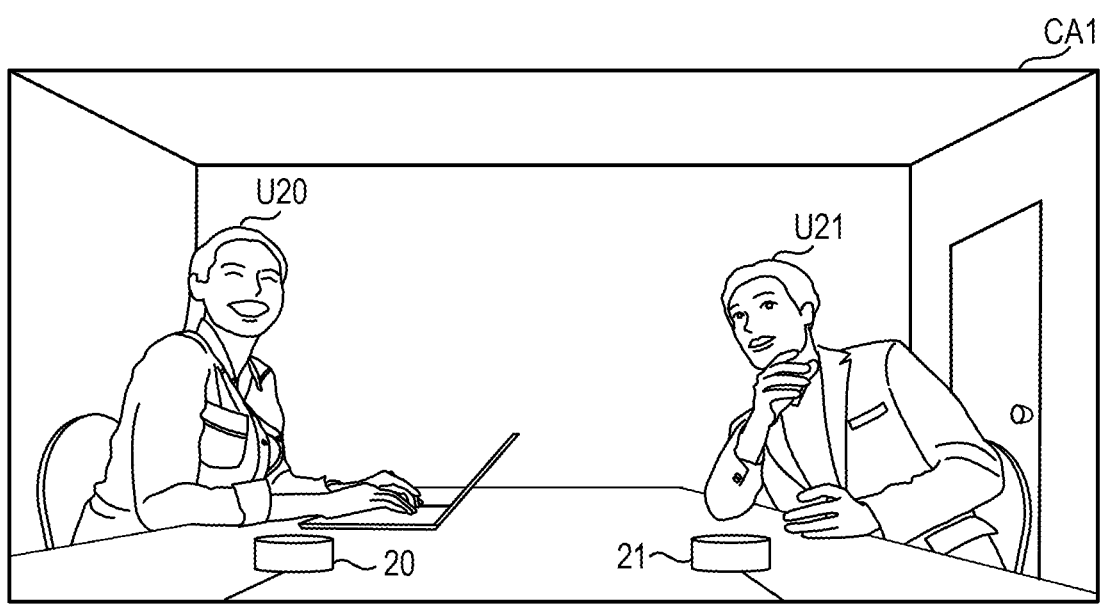
FIG. 11 is a view showing an example of an image CA1 that the management apparatus 10d has obtained from a capturing camera.
Figure 12:
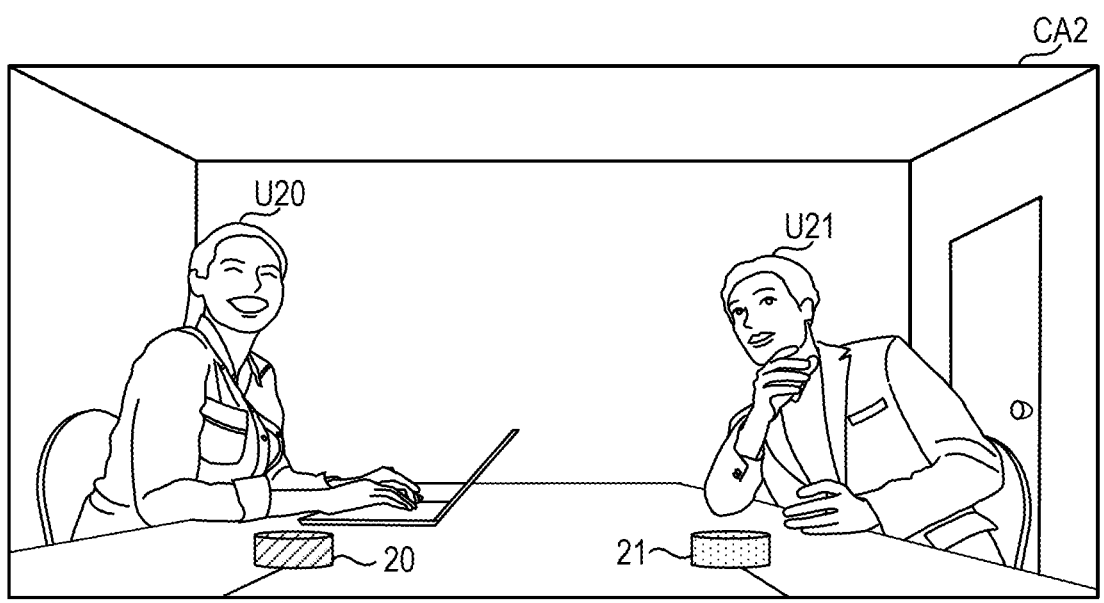
FIG. 12 is a view showing an example of an image CA2 that the management apparatus 10d has generated.

Hereinafter, Application Example 2 of a management apparatus 10d will be described with reference to the drawings. FIG. 11 is a view showing an example of an image CA1 that the management apparatus 10d has obtained from a capturing camera. FIG. 12 is a view showing an example of an image CA2 that the management apparatus 10d has generated.

In the present application example, the management apparatus 10d obtains an image captured by the capturing camera. Then, the management apparatus 10d, by performing analysis processing (analysis processing by artificial intelligence, or pattern matching using template data) on an obtained image, determines whether or not the microphones 20, 21, and 22 are captured in the image. The management apparatus 10d, in a case of determining the microphones 20, 21, and 22 are captured in the image, specifies a part in which the microphones 20, 21, and 22 are captured in the image. Then, the management apparatus 10d, by changing the color of the part in which the microphones 20, 21, and 22 are captured in the image according to the state of the microphones 20, 21, and 22, generates an image CA2 that shows the state of the microphones 20, 21, and 22.

For example, as shown in FIG. 11, the management apparatus 10d receives the image CA1 from the capturing camera, and performs analysis processing on the image CA1. The microphones 20 and 21 are captured in the image CA1 shown in FIG. 11. Accordingly, the management apparatus 10d determines that "the microphones 20 and 21 are captured in the image CA1." The management apparatus 10d specifies the part (a region of 100×100 pixels, for example) in which the microphones 20 and 21 are captured in the image CA1.

The management apparatus 10d, for example, when the microphone 20 is in the mute-off state and when the microphone 21 is in the mute-on state, by changing the color of the part in which the microphone 20 is captured in the image CA1 to green, and changing the color of the part in which the microphone 21 is captured in the image CA1 to orange, generates the image CA2 that shows the state of the microphones 20 and 21 (see FIG. 12). The management apparatus 10d causes a display included in the PC 30 or the like to display the image CA2. The talkers U20 and U21, by looking at the image CA2, can determine whether or not the own conversation may be heard by a telephone call partner. As a result, the talkers U20 and U21 can enjoy the same customer experience as the customer experience of the management apparatus 10.

It is to be noted that, in the example shown in FIG. 11, the capturing camera is placed on a table, for example, in a room. However, in the room, the capturing camera does not necessarily need to be placed on the table. The capturing camera may be placed on a wall or a ceiling in the room, for example.

It is to be noted that the management apparatus 10d may generate a simple image (hereinafter, referred to as a second image) that simulates the room and the microphones 20 and 21 based on the image CA1, and may cause a display included in the PC 30 to display the second image.

It is to be noted that the management apparatus 10d does not necessarily have to specify the part in which the microphones 20 and 21 are captured by performing analysis processing on the image CA1. For example, the flash memory 203 of the management apparatus 10d stores in advance information (hereinafter, referred to as position information) according to positions in which the microphones 20 and 21 are placed. Then, the management apparatus 10d may generate the image CA2, based on the position information.

The description of the foregoing embodiments and modifications is illustrative in all points and should not be construed to limit the present disclosure. The scope of the present disclosure is defined not by the foregoing embodiments and modifications but by the following claims. Further, the scope of the present disclosure is intended to include all changes within the scopes of the claims of patent and within the meanings and scopes of equivalents.

The configurations of the management apparatuses 10 and 10a to 10d may be optionally combined with each other.

What is claimed is:

1. A microphone state display method comprising:
   receiving a mute-on or a mute-off operation by each of a plurality of microphones;
   displaying a state of a microphone that has received the mute-off operation as a first state on a display;
   when receiving the mute-on operation, in a case in which at least one microphone among the plurality of microphones is in a mute-off state, displaying a state of a microphone that has received the mute-on operation as a second state on the display; and
   when receiving the mute-on operation, in a case in which all of the plurality of microphones are in a mute-on state, displaying the state of the microphone that has received the mute-on operation as a third state on the display.

2. The microphone state display method according to claim 1, comprising:
   performing a comparison between a first audio signal obtained by a microphone in a mute-on state and a second audio signal obtained by a microphone in a mute-off state, wherein, in a case in which a sound of a sound source included in the first audio signal is not included in the second audio signal, even when the at least one microphone among the plurality of microphones is in the mute-off state, the state of the microphone that has received the mute-on operation is displayed as the third state on the display.

3. The microphone state display method according to claim 2, wherein the comparison is performed based on a cross correlation between the first audio signal and the second audio signal.

4. The microphone state display method according to claim 1, comprising:
  transitioning a display of a first microphone from the first state to the second state in response to the mute-on operation being received by the first microphone which was displayed as being in the first state when the at least one microphone among the plurality of microphones is in the mute-off state; and
  transitioning the display of the first microphone from the first state to the third state in response to the mute-on operation being received by the first microphone which was displayed as being in the first state when all of the plurality of microphones are in the mute-on state.

5. The microphone state display method according to claim 1, comprising:
  transitioning a display of a second microphone from the second state to the first state in response to the mute-off operation being received by the second microphone which was displayed as being in the second state; and
  transitioning the display of the second microphone from the second state to the third state in response to all the plurality of microphones being in the mute-on state.

6. The microphone state display method according to claim 1, comprising:
  transitioning a display of a third microphone from the third state to the first state in response to the mute-off operation being received by the third microphone which was displayed as being in the third state; and
  transitioning the display of the third microphone from the third state to the second state in response to at least one microphone other than the third microphone among the plurality of microphones is in the mute-off state.

7. The microphone state display method according to claim 1, wherein each of the plurality of microphones includes the display.

8. The microphone state display method according to claim 7, wherein:
  the display includes an LED; and
  wherein the method comprises:
  displaying the LED in a different color or at a different blinking rate for each of the first state, the second state, and the third state.

9. The microphone state display method according to claim 1, wherein a first information processing apparatus to be connected to the plurality of microphones or a second information processing apparatus connected to the first information processing apparatus includes the display.

10. A microphone state display apparatus comprising:
  a processor that is connected to a plurality of microphones, wherein the processor is configured to:
  display a state of a microphone that has received a mute-off operation as a first state on a display;
  display a state of a microphone that has received a mute-on operation as a second state on the display in response to receiving a mute-on operation when at least one microphone among the plurality of microphones is in a mute-off state; and
  display the state of the microphone that has received the mute-on operation as a third state on the display in response to receiving the mute-on operation when all the plurality of microphones are in a mute-on state.

11. The microphone state display apparatus according to claim 10, wherein the processor is configured to:
  perform a comparison between a first audio signal obtained by the microphone in the mute-on state and a second audio signal obtained by the microphone in the mute-off state; and
  display the state of the microphone that has received the mute-on operation as the third state on the display in response to determining that a sound of a sound source included in the first audio signal is not included in the second audio signal, even when at least one microphone among the plurality of microphones is in the mute-off state.

12. The microphone state display apparatus according to claim 11, wherein the processor is configured to:
  perform the comparison based on a cross correlation between the first audio signal and the second audio signal.

13. The microphone state display apparatus according to claim 10, wherein the processor is configured to:
  cause a display of a first microphone to transition from the first state to the second state in response to receiving the mute-on operation by the first microphone displayed as being in the first state when at least one microphone among the plurality of microphones is in the mute-off state; and
  cause the display of the first microphone to transition from the first state to the third state in response to receiving the mute-on operation by the first microphone displayed as being in the first state when all the plurality of microphones are in the mute-on state.

14. The microphone state display apparatus according to claim 10, wherein the processor is configured to:
  cause a display of a second microphone to transition from the second state to the first state in response to receiving the mute-off operation by the second microphone displayed as being in the second state; and
  cause the display of the second microphone to transition from the second state to the third state in response to all the plurality of microphones being in the mute-on state.

15. The microphone state display apparatus according to claim 10, wherein the processor is configured to:
  causes a display of a third microphone to transition from the third state to the first state when receiving the mute-off operation by the third microphone displayed as being in the third state; and
  cause the display of the third microphone to transition from the third state to the second state in response to at least one microphone other than the third microphone among the plurality of microphones being in the mute-off state.

16. The microphone state display apparatus according to claim 10, wherein each of the plurality of microphones includes the display.

17. The microphone state display apparatus according to claim 16, wherein:
  the display includes an LED; and
  the processor is configured to cause the LED to be displayed in a different color or at a different blinking rate for each of the first state, the second state, and the third state.

18. The microphone state display apparatus according to claim 10, wherein the microphone state display apparatus or an information processing apparatus connected to the microphone state display apparatus includes the display.

* * * * *